United States Patent [19]
Matsuo

[11] Patent Number: 6,104,975
[45] Date of Patent: Aug. 15, 2000

[54] METHOD AND APPARATUS FOR CALCULATING A PSEUDO CRANK ROTATIONAL SPEED FOR A BICYCLE

[75] Inventor: Nobuyuki Matsuo, Shimonoseki, Japan

[73] Assignee: Shimane, Inc., Osaka, Japan

[21] Appl. No.: 08/920,317

[22] Filed: Aug. 27, 1997

[30] Foreign Application Priority Data

Sep. 4, 1996 [JP] Japan .................................. 8-253759

[51] Int. Cl.$^7$ ................................................. F16H 63/00
[52] U.S. Cl. .................................. 701/93; 701/55; 474/70
[58] Field of Search ................................ 701/93, 51, 55, 701/56; 474/70, 78, 103

[56] References Cited

U.S. PATENT DOCUMENTS

| | | | |
|---|---|---|---|
| 3,898,563 | 8/1975 | Erisman | 324/166 |
| 4,443,008 | 4/1984 | Shimano | 272/73 |
| 4,633,213 | 12/1986 | Tsuyama | 340/134 |
| 4,854,191 | 8/1989 | Nagano | 74/750 B |
| 5,213,548 | 5/1993 | Colbert et al. | 474/71 |
| 5,254,044 | 10/1993 | Anderson | 474/70 |
| 5,261,858 | 11/1993 | Browning | 474/69 |
| 5,356,348 | 10/1994 | Bellio et al. | 474/70 |
| 5,644,511 | 7/1997 | McWhorter | 364/565 |

FOREIGN PATENT DOCUMENTS

543453 A1   5/1993   European Pat. Off. .
WO 95/26900  10/1995   WIPO .

*Primary Examiner*—Tan Nguyen
*Attorney, Agent, or Firm*—James A. Deland

[57] ABSTRACT

A pseudo crank rotational speed determining unit for a bicycle includes a speed determining unit which determines a speed of the bicycle and a pseudo crank rotational speed determining unit. The pseudo crank rotational speed determining unit operatively communicates with the speed determining unit and determines a pseudo crank rotational speed from the determined speed of the bicycle. In a more specific embodiment, a front gear identifying unit identifies a front gear of the bicycle, and a rear gear identifying unit identifies a rear gear of the bicycle. The pseudo crank rotational speed determining unit determines a gear ratio from the identified front gear and the identified rear gear, and then the pseudo crank rotational speed is determined from the determined speed of the bicycle and from the determined gear ratio.

21 Claims, 5 Drawing Sheets

METHOD AND APPARATUS FOR CALCULATING A PSEUDO CRANK ROTATIONAL SPEED FOR A BICYCLE

BACKGROUND OF THE INVENTION

The present invention is directed to bicycle computers and, more particularly, to a pseudo crank speed arithmetic unit for a bicycle wherein the pseudo crank rotational speed is computed assuming that the crank is being rotationally driven at a rate that would sustain the traveling speed of the bicycle.

There are known bicycle computers for digitally displaying various bicycle data, such as the speed of the bicycle, the distance traveled, lap times, crank spindle torque, the shift position of the change gear device, the pulse rate or blood pressure of the rider, and so on.

Frequently, the crank of the bicycle is not rotationally driven when the rider is coasting or going downhill. If the rider thereafter wants to resume pedaling by pressing on the stationary pedals and turning the crank, no-load rotational drive will result as long as the rotational speed at which the crank is actually driven is lower than the travel speed. Accordingly, the rider usually wants to resume pedaling at least fast enough for the rotational speed of the crank to match the travel speed of the bicycle. However, when the bicycle is coasting or going downhill and the rider tries to press the stationary pedals and turn the crank, he or she has no idea how fast to pedal. If the rider misjudges the crank rotational speed, then there will be a time loss until the point when the crank is actually driven.

The magnitude of the rotational torque at which the crank is driven is determined to a certain extent by the muscle power (such as that of the legs) of the bicycle rider, and a gear ratio that matches the rider's muscle power is determined when the rider selects the front gear and the rear gear. Thus, once the desired travel speed of the bicycle is set, the gear ratio determines the optimal crank rotational speed for that rider's ability. When the bicycle is moving so fast that the rotational speed of the crank used before coasting or proceeding downhill is no longer proper, the rider needs only to make a gear change in order to find the optimal pedal speed. However, since there is no criterion for selecting this gear change, quite a bit of experience is needed to select the optimal gear ratio.

SUMMARY OF THE INVENTION

The present invention is directed to a method and apparatus for calculating a pseudo crank rotational speed for a bicycle, wherein the rotational speed of the crank can be computed even when the crank is stationary. The pseudo crank rotational speed can be computed without a sensor being installed on the crank, and it can be used by the cyclist to determine the proper rotational speed to resume pedaling during coasting or traveling downhill.

In one embodiment of the present invention, a pseudo crank rotational speed determining unit for a bicycle includes a traveling speed determining unit which determines a traveling speed of the bicycle and a pseudo crank rotational speed determining unit. The pseudo crank rotational speed determining unit operatively communicates with the traveling speed determining unit and determines a pseudo crank rotational speed from the traveling speed of the bicycle. In a more specific embodiment, a front gear identifying unit identifies a front gear of the bicycle, and a rear gear identifying unit identifies a rear gear of the bicycle. The pseudo crank rotational speed determining unit determines a gear ratio from the identified front gear and the identified rear gear, and then the pseudo crank rotational speed is determined from the traveling speed and from the gear ratio.

If desired, a display may be provided for displaying the pseudo crank rotational speed. Furthermore, a crank rotational speed sensor may operatively communicate with the pseudo crank rotational speed determining unit, and the pseudo crank rotational speed determining unit may display both the pseudo crank rotational speed and the actual crank rotational speed sensed by the crank rotational speed sensor.

DETAILED DESCRIPTION OF THE EMBODIMENTS

Figure 1:
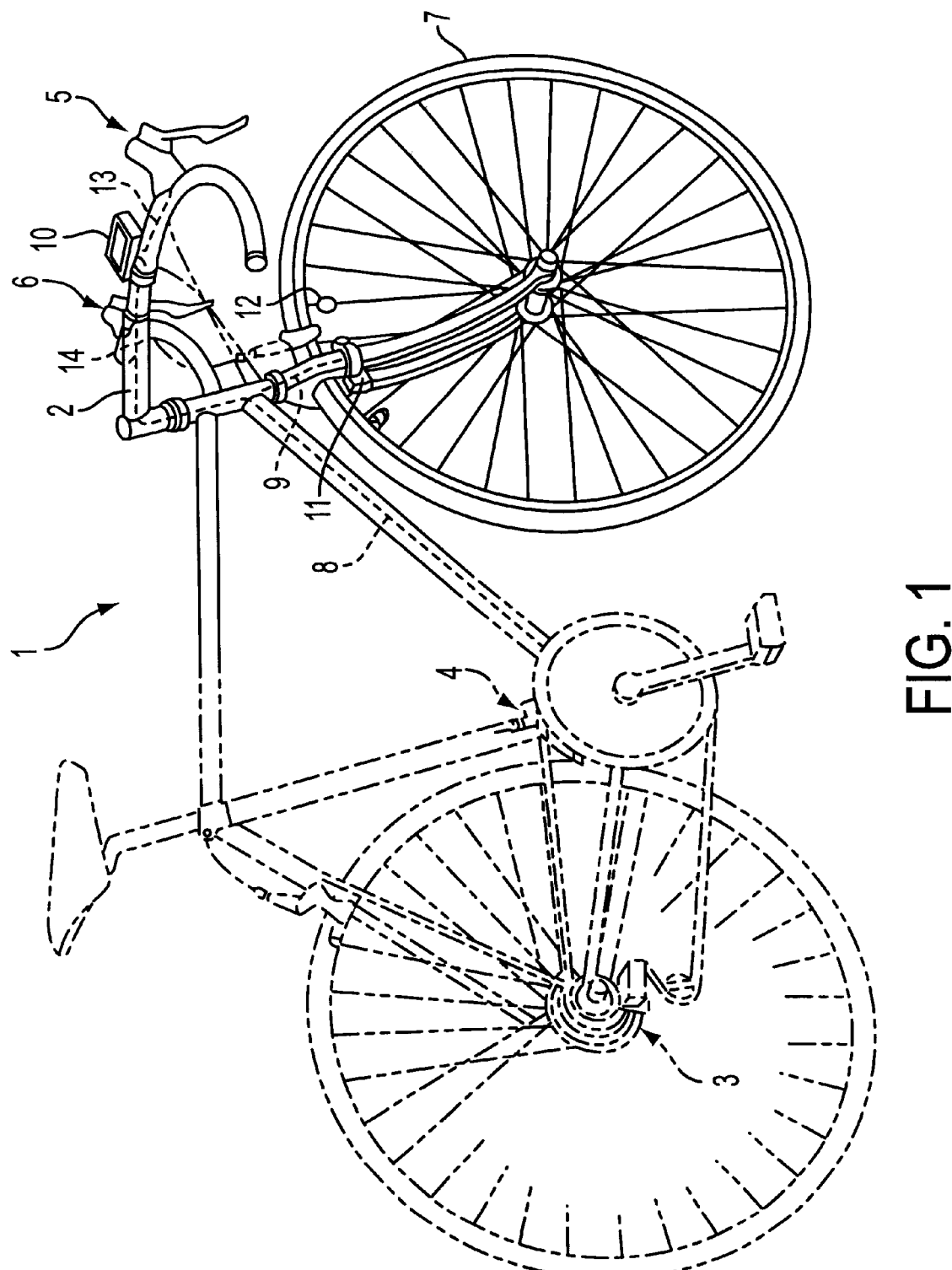
FIG. 1 is a side view of a bicycle which incorporates a particular embodiment of a pseudo crank rotational speed arithmetic unit according to the present invention.

FIG. 1 is a side view of a particular embodiment of a bicycle which incorporates a pseudo crank rotational speed arithmetic unit according to the present invention. As shown in FIG. 1, a rear derailleur 3, which is a change gear device, is installed on the rear wheel of the bicycle 1. The rear derailleur 3 allows the desired sprocket to be selected while the chain is derailed by operation of the rear shift lever 5 provided to the handlebar 2. The detailed construction of the rear derailleur 3 and the rear shift lever 5 is known (see, for example, Japanese Laid-Open Patent Application 2-225191), and the description of this construction will be omitted here. Similarly, a front derailleur 4 selects the desired front gear while the chain is derailed by operation of the front shift lever 6 provided to the handlebar 2.

The pseudo crank speed arithmetic unit 10 is installed on the handlebar 2. The pseudo crank speed arithmetic unit 10 is connected by a wire 9 to a magnetic vehicle speed sensor 11 provided to the front fork. In this embodiment, the magnetic vehicle speed sensor 11 is a lead switch that is magnetically sensitive. A magnet 12 is fixed to the spokes of the front tire 7, and the magnetic vehicle speed sensor 11 detects the proximity of the magnet 12 every time the front tire 7 makes one full rotation. This detection allows the time required for one rotation of the front tire 7 to be clocked, and it allows the rotational speed of the front tire 7 to be measured. Similarly, a magnet (not shown) is fixed to the left crank (not shown), and a magnetic crank speed sensor 32 (see FIG. 3) is located at a frame position corresponding to this magnet. The magnetic crank speed sensor 32 is used to monitor the speed at which the crank is actually rotating.

The pseudo crank speed arithmetic unit 10 is connected to a wire 13 and a wire 14 that are used to identify the shift positions of the rear shift lever 5 and the front shift lever 6. An electrical contact is disposed at the rear shift lever 5 and at the front shift lever 6, which allows the shift positions thereof to be identified. The pseudo crank speed arithmetic unit 10 ascertains the shift positions of the rear shift lever 5 and the front shift lever 6 via the wires 13 and 14. The construction of these contacts is known, and so will not be discussed (see, for example, Japanese Laid-Open Patent Application 63-90490).

Figure 2:
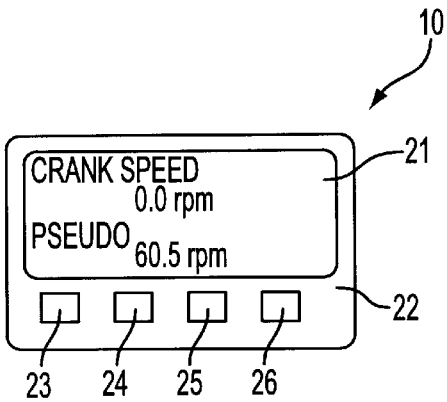
FIG. 2 is a front view of the exterior of the pseudo crank rotational speed arithmetic unit shown in FIG. 1.
Figure 3:
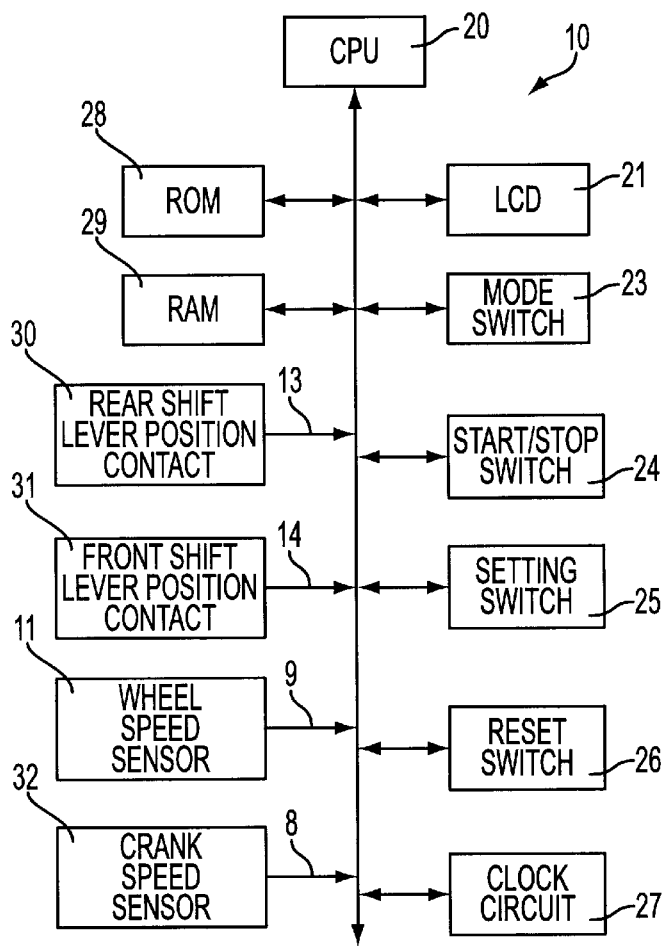
FIG. 3 is a block diagram illustrating a particular embodiment of circuitry used with the pseudo crank rotational speed arithmetic unit according to the present invention.

FIG. 2 is a front view of the pseudo crank speed arithmetic unit 10, and FIG. 3 is a function block diagram illustrating the internal circuitry thereof. Various switches 23, 24, 25, 26 and an LCD (liquid crystal display) 21 for displaying data are arranged on the front of the housing 22 of the pseudo crank speed arithmetic unit 10. More specifically, a mode switch 23 is used to select the type of data displayed on the LCD 21 and the display configuration. When the mode switch 23 is used to select the crank rotational speed display mode, in this example, the actual crank rotational speed (indicated in revolutions per minute (rpm)) is given in the upper row of the LCD 21, and the pseudo crank rotational speed per minute (indicated as pseudo), assuming that the crank is being rotated at the same speed as the actual vehicle speed, is displayed in the lower row of the LCD 21. A start/stop switch 24 is a push-button switch that is used to control the beginning and end of the monitoring of travel distance and lap times, and the setting switch 25 is a push-button switch that is used to set the numerical values required for the computation and display of the travel distance and the like, such as the outside diameter of the front tire 7. A reset switch 26 is a push-button switch that operated when the various stored data are to be reset.

FIG. 3 is a function block diagram illustrating the internal circuitry of the pseudo crank speed arithmetic unit 10. As shown in FIG. 3, the LCD 21 is controlled by a CPU 20. The CPU 20 detects a pulse signal emitted by the speed sensor 22 when the magnet 12 is in close proximity to the speed sensor 22. After this pulse signal has been detected, the time it takes for the front tire 7 to rotate once and for the magnet 12 to come back into the proximity of the sensor 22 position is determined by computation from the time emitted from a clock circuit 27. The clock circuit 27 has a circuit which signals the absolute time. The CPU 20 performs the required processing, which is discussed below, by means of the program and data stored in a read-only memory (ROM) 28 and a random-access memory (RAM) 29. The rear shift lever position contact 30 is an electrical contact that is used to detect the position of the rear shift lever 5, and the front shift lever position contact 31 is an electrical contact that is used to detect the shift position of the front shift lever 6.

The operation will now be described for a mode in which the pseudo crank rotational speed and the actual rotational speed are displayed by the pseudo crank speed arithmetic unit 10.

Figure 4:
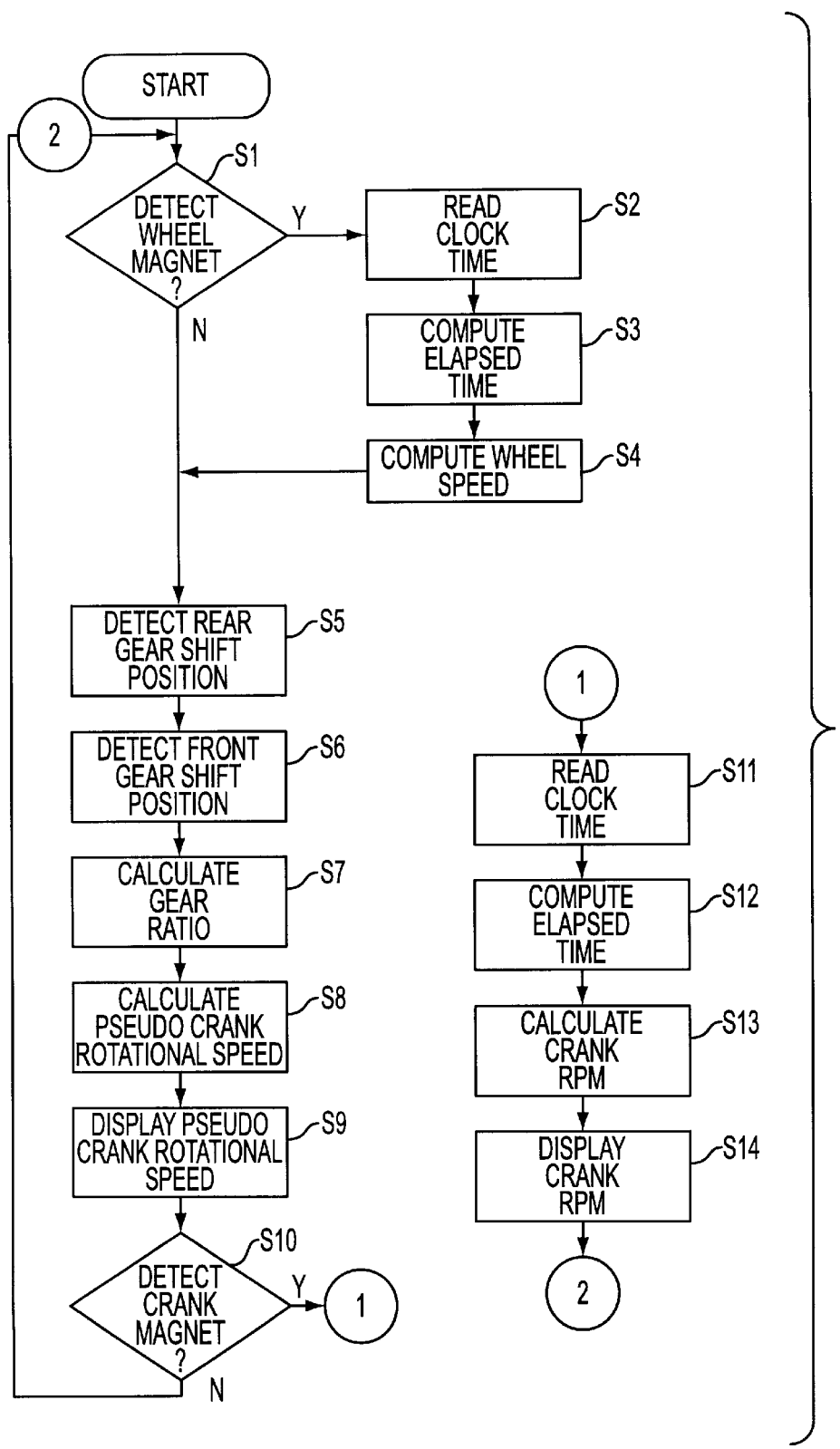
FIG. 4 is a flow chart illustrating a particular embodiment of an algorithm according to the present invention used to calculate a pseudo crank rotational speed.

FIG. 4 is a flow chart illustrating the operation of the pseudo crank speed arithmetic unit 10 in a pseudo crank rotational speed display mode. First, the mode switch 23 is operated to select the display mode for the pseudo crank rotational speed. The CPU 20 reads the program for the pseudo crank rotational speed display mode stored in the ROM 28 and begins the operation of the pseudo crank speed arithmetic unit 10. It is then ascertained in a step S1 whether the magnetic wheel sensor 11 has detected the magnet 12 provided to the front wheel. More specifically, when the magnet 12 nears the magnetic wheel sensor 11, the contact of the lead switch on the inside closes, and voltage is emitted in the form of a pulse. When this pulse is detected, the time is read from the clock circuit and written to the RAM 29 in a step S2. The time required for one rotation of the front tire 7 is computed from the time of the pulse detected in the previous cycle and the time of the newly detected pulse in the next cycle in a step S3. After this time is computed, then the number of revolutions per minute (rpm) of the front tire 7 is computed in a step S4, and these results are written to the RAM 29.

The rear gear position is sensed from the rear shift lever position contact 30 in a step S5, and the number of teeth of the rear sprocket selected by the rear derailleur 3 is read from the RAM 29 after correlation with the sensed rear gear position. Similarly, the front gear position is sensed from the front shift lever position contact 31 in a step S6. The gear ratio (gear ratio=number of teeth of the front gear÷number of teeth of the rear sprocket) is then computed in a step S7.

Next, the pseudo crank rotational speed (pseudo crank rotational speed (rpm)=wheel rotational speed (rpm)÷gear ratio) is computed in a step S8. After the pseudo crank rotational speed is computed, then the numerical value thereof is displayed as the pseudo crank rotational speed on the display 11 in a step S9.

It is also ascertained, by the same principle as with the magnetic vehicle speed sensor 11, whether the magnetic crank speed sensor 32 has detected the magnet (not shown) provided to the frame in a step S10. If the magnetic crank speed sensor 32 detects a pulse, then the time is read from the clock circuit and written to the RAM 29 in a step S11. The time required for one rotation of the crank is then computed from the time of the pulse detected in the previous cycle and the time of the newly detected pulse in the next cycle in a step S12. After this time is computed, then the number of revolutions per minute (rpm) of the crank can also be computed in a step S13, and these results are displayed on the LCD 21 in a step S14.

The rider looks at the display of this pseudo crank rotational speed, and is able to select the gear ratio, that is, the pedal rotational speed, that is suited to his or her own muscle strength and to the vehicle speed in a state in which the legs are stopped, such as on a downhill stretch. Therefore, pedaling can be resumed with no time lag.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

In the described embodiment the magnetic crank speed sensor 32 and the magnetic vehicle speed sensor 11 were lead switches, but they may also be hall elements, optical sensors, or other such detection means. A single magnet 12 was used, but a plurality of magnets may also be arranged at equal angles in a circle. A magnetic crank speed sensor 32 was employed, but it is not necessarily required in a case in which only the pseudo crank rotational speed is computed or displayed.

The pseudo crank rotational speed was merely displayed in the above embodiment, but another method that may be used is one in which the pseudo crank rotational speed is computed, and if it is determined to be over or under a pre-set crank rotational speed, then a shift command dictating a shift to a predetermined specific shift stage is displayed on the LCD 21. The setting of this shift stage may be stored in the memory ahead of time according to the athletic ability of the rider.

Furthermore, this pseudo rotational speed can be used for the control of other things, such as selecting the number of teeth of the front gear and the rear sprocket. In the case of a bicycle not equipped with a shift mechanism, there is no need for the rear shift lever position contact 30 or the front shift lever position contact 31.

Figure 5:
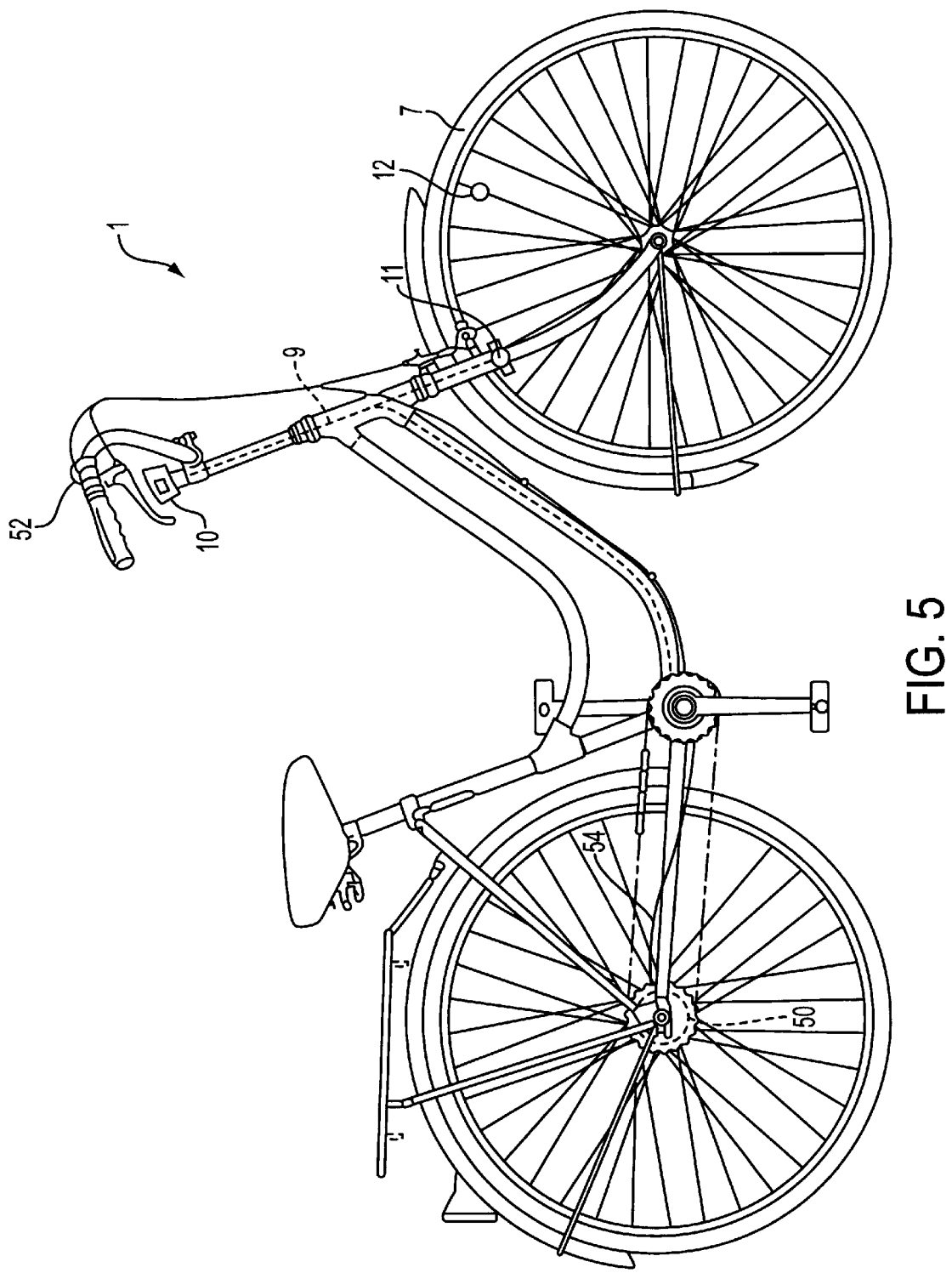
FIG. 5 is a side view of an alternative embodiment of a bicycle which incorporates the pseudo crank rotational speed arithmetic unit according to the present invention.
Figure 6:
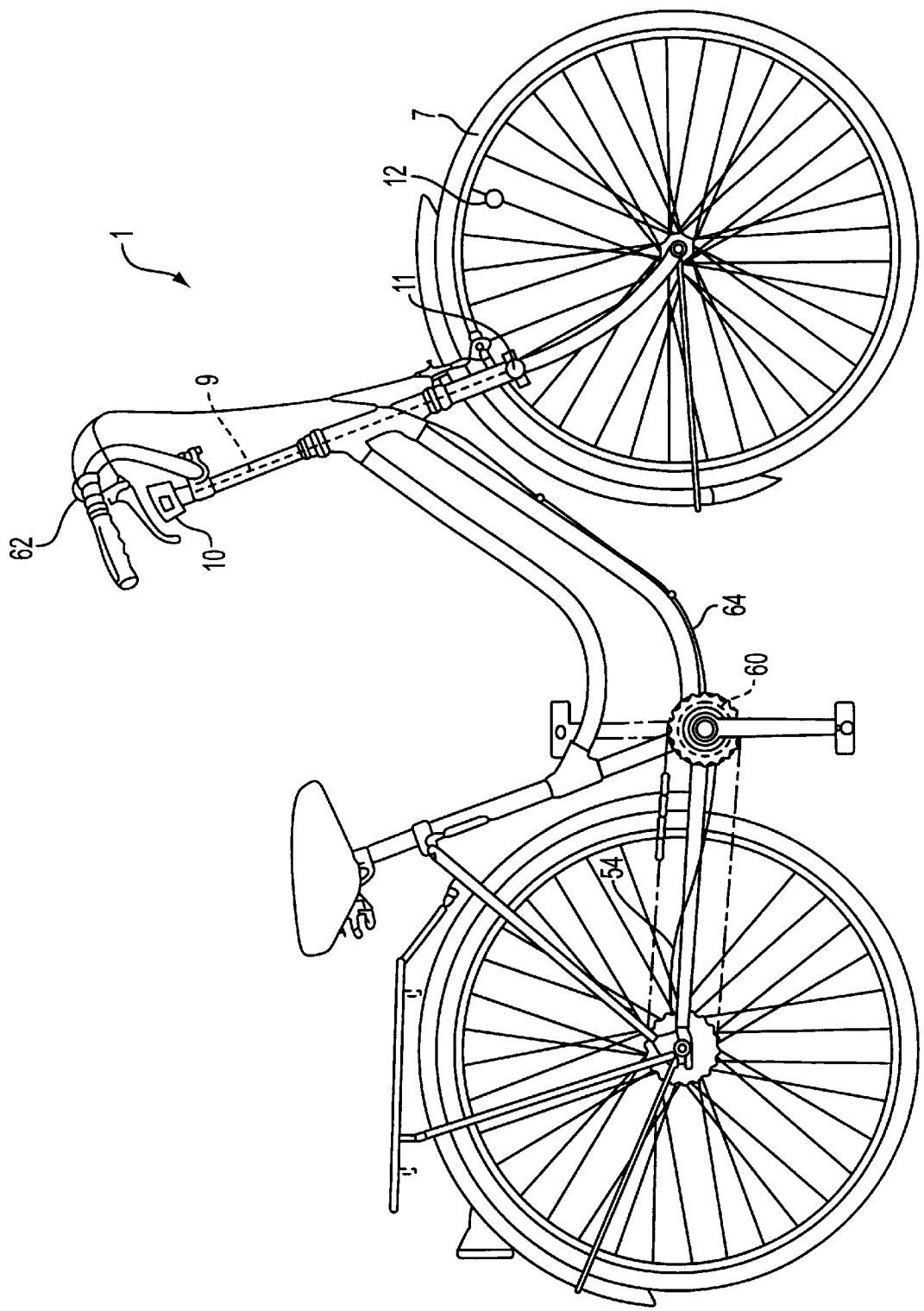
FIG. 6 is a side view of another alternative embodiment of a bicycle which incorporates the pseudo crank rotational speed arithmetic unit according to the present invention.

As shown in FIG. 5, the pseudo crank speed arithmetic unit 10 may be installed on a bicycle having a conventional rear wheel hub-type internally mounted bicycle transmission 50 connected to a shift lever 52 (with shift position identifying electrical contacts, not shown) through a control cable 54. Alternatively, as shown in FIG. 6, pseudo crank speed arithmetic unit 10 may be installed on a bicycle having an internally mounted crankset-type bicycle transmission 60 connected to a shift lever 62 (with shift position identifying electrical contacts, not shown) through a control cable 64. Transmission 60 may be constructed in accordance with the teachings of U.S. Pat. No. 4,854,191, incorporated herein by reference.

Thus, the scope of the invention should not be limited by the specific structures disclosed. Instead, the true scope of the invention should be determined by the following claims.

What is claimed is:

1. A pseudo crank rotational speed calculating apparatus for a bicycle comprising:
   a crank rotational speed sensor which determines an actual rotational speed of a crank;
   a traveling speed determining unit which determines a speed of the bicycle; and
   a pseudo crank rotational speed determining unit, operatively communicating with the traveling speed determining unit, which determines a pseudo crank rotational speed from the traveling speed.

2. The apparatus according to claim 1 wherein the speed determining unit comprises a wheel speed sensor.

3. The apparatus according to claim 1 further comprising:
   a front gear identifying unit for identifying a front gear of the bicycle;
   a rear gear identifying unit for identifying a rear gear of the bicycle;
   wherein the pseudo crank rotational speed determining unit operatively communicates with the front gear identifying unit and the rear gear identifying unit; and
   wherein the pseudo crank rotational speed determining unit determines the pseudo crank rotational speed from the traveling speed of the bicycle, the identified front gear, and the identified rear gear.

4. The apparatus according to claim 3 wherein the front gear identifying unit comprises a front gear sensor for sensing a front gear selected by a front gear shift control device, and wherein the rear gear identifying unit comprises a rear gear sensor for sensing a rear gear selected by a rear gear shift control device.

5. The apparatus according to claim 3 wherein the pseudo crank rotational speed determining unit determines a gear ratio from the identified front gear and the identified rear gear, and wherein the pseudo crank rotational speed is determined from the traveling speed of the bicycle and from the gear ratio.

6. The apparatus according to claim 1 wherein the pseudo crank rotational speed corresponds to a rotational speed of the crank that would sustain the traveling speed of the bicycle.

7. The apparatus according to claim 1 further comprising a display for displaying the pseudo crank rotational speed.

8. The apparatus according to claim 7 wherein the pseudo crank rotational speed determining unit displays both the pseudo crank rotational speed and the crank rotational speed sensed by the crank rotational speed sensor.

9. The apparatus according to claim 1 further comprising:
   a rear gear identifying unit for identifying a rear gear of a hub-type internally mounted transmission;
   wherein the pseudo crank rotational speed determining unit operatively communicates with the rear gear identifying unit; and
   wherein the pseudo crank rotational speed determining unit determines the pseudo crank rotational speed from the traveling speed of the bicycle and the identified rear gear.

10. The apparatus according to claim 1 further comprising:
    a front gear identifying unit for identifying a front gear of a crankset-type internally mounted transmission;
    wherein the pseudo crank rotational speed determining unit operatively communicates with the front gear identifying unit; and
    wherein the pseudo crank rotational speed determining unit determines the pseudo crank rotational speed from the traveling speed of the bicycle and the identified front gear.

11. A pseudo crank rotational speed determining apparatus for a bicycle comprising:
    traveling speed determining means for determining a traveling speed of the bicycle;
    a front shift lever position contact for identifying a front gear of the bicycle;
    a rear shift lever position contact for identifying a rear gear of the bicycle;
    pseudo crank rotational speed determining means, operatively communicating with the speed determining means, the front shift lever position contact, and the rear shift lever position contact, for determining a gear ratio from the identified front gear and the identified rear gear and for determining a pseudo crank rotational speed from the gear ratio and the traveling speed of the bicycle; and
    wherein the pseudo crank rotational speed corresponds to a rotational speed of the crank that would sustain the traveling speed of the bicycle.

12. The apparatus according to claim 11 further comprising a display for displaying the pseudo crank rotational speed.

13. The apparatus according to claim 12 further comprising a crank rotational speed sensor operatively communicating with the pseudo crank rotational speed determining means, wherein the pseudo crank rotational speed determining unit displays both the pseudo crank rotational speed and the crank rotational speed sensed by the crank rotational speed sensor.

14. The apparatus according to claim 12 wherein the front gear identifying means comprises a front gear sensor for sensing a front gear selected by a front gear shift control device, and wherein the rear gear identifying means comprises a rear gear sensor for sensing a rear gear selected by a rear gear shift control device.

15. A method of determining a pseudo crank rotational speed for a bicycle comprising the steps of:
    determining, with a crank speed sensor, an actual crank rotational speed;
    determining, with a speed sensor, a traveling speed of the bicycle; and
    automatically determining, with an arithmetic unit and using the sensed traveling speed, a pseudo crank rotational speed corresponding to a rotational speed of a crank that would sustain the traveling speed of the bicycle.

16. The method according to claim 15 further comprising the step of displaying the pseudo crank rotational speed.

17. The apparatus according to claim 15 wherein the pseudo crank rotational speed determining step comprises the steps of:

determining a gear ratio from a currently selected front gear and a currently selected rear gear; and determining the pseudo crank rotational speed from the gear ratio and the traveling speed.

18. The method according to claim 17 further comprising the step of displaying the pseudo crank rotational speed.

19. The method according to claim 18 further comprising the step of:

displaying the actual crank rotational speed.

20. A method of determining a pseudo crank rotational speed for a bicycle comprising the steps of:

determining a position of a front shift lever;

determining a position of a rear shift lever;

determining, with a speed sensor, a traveling speed of the bicycle; and automatically determining, with an arithmetic unit and using the sensed traveling speed, the position of the front shift lever and the position of the rear shift lever, a pseudo crank rotational speed corresponding to a rotational speed of a crank that would sustain the traveling speed of the bicycle.

21. The method according to claim 20 wherein the step of determining a position of the front shift lever comprises the step of determining the position of the front shift lever with a front shift lever position contact, and wherein the step of determining a position of the rear shift lever comprises the step of determining the position of the rear shift lever with a rear shift lever position contact.

\* \* \* \* \*